(12) United States Patent
Takeshima et al.

(10) Patent No.: US 8,061,467 B2
(45) Date of Patent: Nov. 22, 2011

(54) ENGINE ARRANGEMENT STRUCTURE OF SADDLE-RIDE TYPE VEHICLE

(75) Inventors: Masao Takeshima, Saitama (JP); Hitoshi Furuhashi, Saitama (JP); Kihoko Kaita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 11/892,878

(22) Filed: Aug. 28, 2007

(65) Prior Publication Data
US 2008/0257630 A1 Oct. 23, 2008

(30) Foreign Application Priority Data
Aug. 31, 2006 (JP) ................. 2006-235945

(51) Int. Cl.
*B60K 5/00* (2006.01)
*B60K 5/02* (2006.01)
*B60K 15/03* (2006.01)
(52) U.S. Cl. ...... 180/291; 180/233; 180/252; 180/65.22
(58) Field of Classification Search ............... 180/291, 180/233, 252, 65.22, 412
See application file for complete search history.

(56) References Cited

U.S. PATENT DOCUMENTS

| | | | |
|---|---|---|---|
| 2,109,316 A * | 2/1938 | Harley ........................ | 180/219 |
| 4,458,642 A * | 7/1984 | Okubo et al. ............. | 123/196 AB |
| 4,674,588 A * | 6/1987 | Yasuda et al. ................ | 180/412 |
| 5,474,146 A * | 12/1995 | Yoshioka et al. ............. | 180/184 |
| 5,515,940 A * | 5/1996 | Shichinohe et al. .......... | 180/376 |
| 5,526,889 A * | 6/1996 | Neary ............................ | 180/6.66 |
| 5,699,872 A * | 12/1997 | Miyakawa et al. ........... | 180/291 |
| 6,170,597 B1 * | 1/2001 | Fukuda ......................... | 180/292 |
| 6,296,073 B1 * | 10/2001 | Rioux et al. .................. | 180/292 |
| 6,357,545 B1 * | 3/2002 | Hori et al. ..................... | 180/219 |
| 6,386,067 B1 * | 5/2002 | Inoue et al. ................... | 74/730.1 |
| 6,712,172 B2 * | 3/2004 | Inagaki et al. ................ | 180/292 |
| 6,725,962 B1 * | 4/2004 | Fukuda ......................... | 180/292 |
| 2005/0224273 A1* | 10/2005 | Conte ........................... | 180/309 |
| 2006/0037797 A1* | 2/2006 | Mathon ........................ | 180/219 |

FOREIGN PATENT DOCUMENTS
JP 10-329553 A 12/1998
* cited by examiner

*Primary Examiner* — J. Allen Shriver, II
*Assistant Examiner* — Bryan Evans
(74) *Attorney, Agent, or Firm* — Birch, Stewart, Kolasch & Birch, LLP

(57) ABSTRACT

An engine arrangement structure of a saddle-ride type vehicle includes an engine having a crankcase and a cylinder part overhung upwardly from the crankcase. An alternating current generator is provided at one end of the crankshaft with a power transmission system member being provided at the other end thereof. The alternating current generator and the power transmission system member are overhung ahead of and behind the engine relative to the engine cylinder part, respectively. A width by which the power transmission system member is overhung is larger than that by which the alternating current generator is overhung. The alternating current generator of the engine is arranged so as to be directed to the front side of the vehicle body and the power transmission system member is arranged so as to be directed to the rear side of the vehicle body.

17 Claims, 5 Drawing Sheets

ENGINE ARRANGEMENT STRUCTURE OF SADDLE-RIDE TYPE VEHICLE

CROSS-REFERENCE TO RELATED APPLICATIONS

The present application claims priority under 35 USC 119 to Japanese Patent Application No. 2006-235945 filed on Aug. 31, 2006 the entire contents of which are hereby incorporated by reference.

BACKGROUND OF THE INVENTION

1. Field of the Invention

The present invention relates to an engine arrangement structure of a saddle-ride type vehicle including two front wheels and two rear wheels.

2. Description of Background Art

There is generally known a saddle-ride type vehicle that includes two front wheels and two rear wheels with a steering system member provided in the front of a body frame. An engine is provided at the center of the body frame, and a seat is arranged behind a cylinder of the engine. See, for example, JP-A No. H10-329553. This kind of vehicle is configured in such a manner that the engine includes a crankshaft extending in the front-rear direction of a vehicle body with an alternating current generator (hereinafter, referred to as ACG) provided at one end of the crankshaft, and a power transmission system member including a torque converter and the like being provided at the other end thereof.

The power transmission system member is overhung ahead of the engine relative to the engine cylinder part, and the ACG is overhung behind the engine relative to the engine cylinder part. In this case, a width by which the power transmission system member is overhung is larger than that by which the alternating current generator is overhung in a general design.

A vehicle with this configuration is required to have a compact design since the steering system member is located ahead of the engine. Even when the engine is displaced to the rear of the vehicle body in order to secure a front space, it is difficult to displace the engine to the rear because the seat is located behind the engine cylinder in the saddle-ride type vehicle including two front wheels and two rear wheels.

SUMMARY AND OBJECTS OF THE INVENTION

An object of an embodiment of the present invention is to provide an engine arrangement structure of a saddle-ride type vehicle capable of securing an available space ahead of an engine without changing a vehicle body configuration by addressing the problem involved in the above-described related art.

In order to achieve the above-described object, an embodiment of the present invention provides an engine arrangement structure of a saddle-ride type vehicle wherein a body frame is provided for suspending an engine. A steering system member is supported by the body frame with a handlebar and a steering shaft. The engine includes a crankcase and a cylinder part overhung upwardly from the crankcase with a crankshaft extending in the front-rear direction of the vehicle body being provided in the crankcase. An alternating current generator is provided at one end of the crankshaft with a power transmission system member being provided at the other end thereof. The alternating current generator and the power transmission system member are overhung ahead of and behind the engine relative to the engine cylinder part, respectively. A width by which the power transmission system member is overhung is larger than that by which the alternating current generator is overhung. The body frame includes a seat located behind the engine cylinder part with two front wheels and two rear wheels being attached thereto. The alternating current generator of the engine is arranged so as to be directed to the front side of the vehicle body and the power transmission system member is arranged so as to be directed to the rear side of the vehicle body.

Since the alternating current generator with a small overhung width is overhung ahead of the engine relative to the engine cylinder part, an available space can be secured ahead of the engine without displacing the engine to the rear of the vehicle body and changing the vehicle body configuration.

The engine may be located between the front wheels and the rear wheels suspended by the body frame, and may be provided nearer the front wheels.

In this configuration, an available space can be secured ahead of the engine, and in addition, a space can be secured on the rear side of the vehicle body by an amount by which the engine is arranged nearer the front wheels.

A front-wheel-side final reduction apparatus is provided ahead of the engine and a rear-wheel-side final reduction apparatus is provided behind the engine, and distances from the engine to the respective final reduction apparatuses may be set in such a manner that a distance to the rear-wheel-side final reduction apparatus is longer than that to the front-wheel-side final reduction apparatus.

A space on the rear side where a distance from the engine is longer becomes larger, as compared to the front side. Accordingly, even when the power transmission system member is largely overhung, the space allows the power transmission system member to be securely accommodated.

An electric power steering mechanism may be provided at the steering shaft part.

Since an available large space can be secured ahead of the engine, vehicle body components such as the electric power steering mechanism can be easily arranged.

The engine is provided with exhaust pipes, which may extend ahead of the engine and then extend to the rear of the vehicle body.

Since an available large space can be secured ahead of the engine, vehicle body components such as the exhaust pipes of the engine can be easily arranged.

An oil tank for preserving engine oil may be provided above the power transmission system member behind the engine on the rear side of the vehicle body.

By arranging heavyweight components such as the oil tank behind the engine, heavyweight components can be accommodated at the center of the vehicle body.

Since the alternating current generator of the engine is arranged so as to be directed to the front side of the vehicle body and the power transmission system member is arranged so as to be directed to the rear side of the vehicle body, the alternating current generator with a small overhung width is overhung ahead of the engine relative to the engine cylinder part. Thus, an available space can be secured ahead of the engine without displacing the engine to the rear of the vehicle body, that is, without changing the vehicle body configuration.

If the engine is located between the front wheels and the rear wheels suspended by the body frame and is provided nearer the front wheels, an available space can be secured ahead of the engine. In addition, a space can be secured on the rear side of the vehicle body by an amount by which the engine is arranged nearer the front wheels.

If a front-wheel-side final reduction apparatus is provided ahead of the engine, a rear-wheel-side final reduction apparatus is provided behind the engine, and distances from the engine to the respective final reduction apparatuses are set in such a manner that a distance to the rear-wheel-side final reduction apparatus is longer than that to the front-wheel-side final reduction apparatus, a space on the rear side where a distance from the engine is longer becomes larger, as compared to the front side. Accordingly, even when the power transmission system member is largely overhung, the space allows the power transmission system member to be securely accommodated.

If an electric power steering mechanism is provided at the steering shaft part, an available large space can be secured ahead of the engine. Thus, vehicle body components such as the electric power steering mechanism can be easily arranged.

If the engine is provided with exhaust pipes, which extend ahead of the engine and then extend to the rear of the vehicle body, an available large space can be secured ahead of the engine. Thus, vehicle body components such as the exhaust pipes of the engine can be easily arranged.

If an oil tank for preserving engine oil is provided above the power transmission system member behind the engine on the rear side of the vehicle body, heavyweight components can be accommodated at the center of the vehicle body by arranging heavyweight components such as the oil tank behind the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will be described with reference to the accompanying drawings. It should be noted that front, rear, left, right, upper, and lower directions in the description are for those of a vehicle body.

Figure 1:
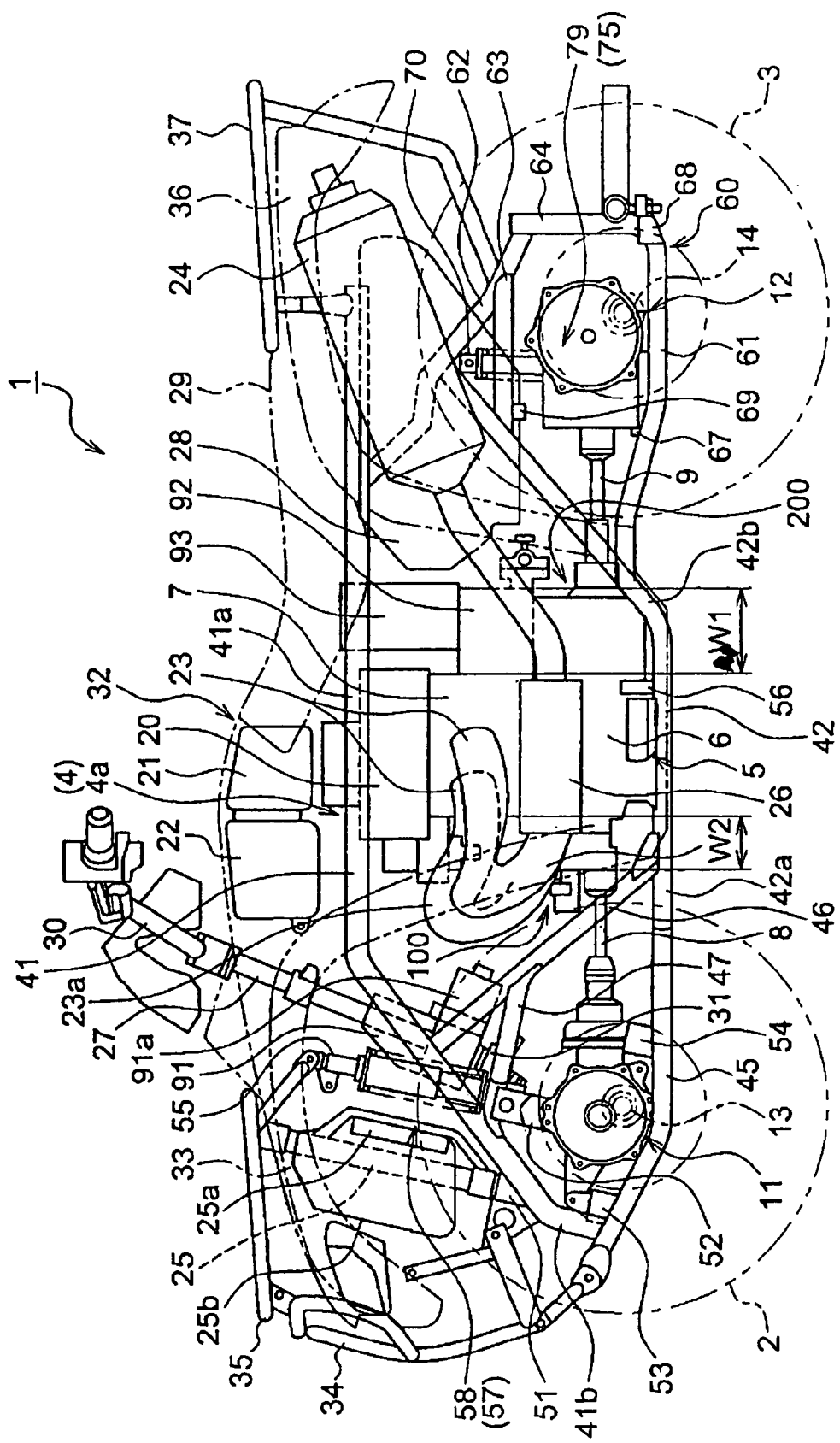
FIG. 1 is a side view showing an embodiment of a saddle-ride type vehicle according to the present invention.
Figure 2:
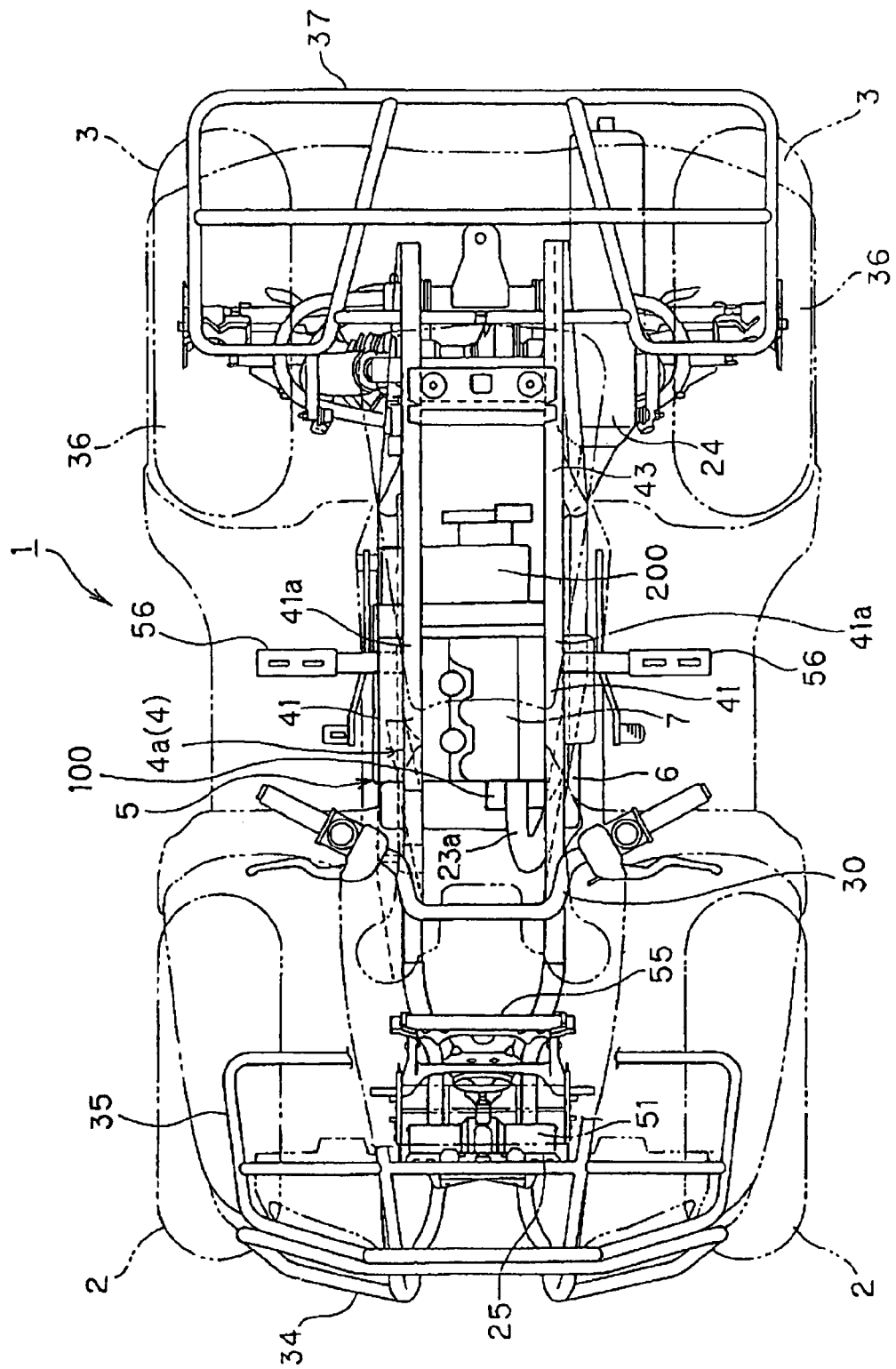
FIG. 2 is a plan view showing the embodiment of the saddle-ride type vehicle according to the present invention.

FIG. 1 is a side view of a saddle-ride type vehicle, and FIG. 2 is a plan view of the same. A saddle-ride type vehicle 1 is a four-wheeled vehicle which is classified as an ATV (All Terrain Vehicle), and is a vehicle suitable for use in connection with agriculture, cattle breeding, hunting, safety monitoring, and the like, or for leisure. The saddle-ride type vehicle 1 includes left and right front wheels 2 and rear wheels 3, all of which are low-pressure balloon tires each having a relatively large diameter. The wheels 2, 3 are mounted in the front and rear of the downsized and lightweight vehicle body. The vehicle 1 is enhanced for performance on an irregular terrain by providing a large ground clearance.

The saddle-ride type vehicle 1 has a body frame 4, at a front portion of which the left and right front wheels 2 are suspended through a front suspension 57 of an independent suspension (double wishbone) type. At a rear portion of the body frame 4 the left and right rear wheels 3 are suspended through a rear suspension 75 of, as similar to the above, the independent suspension (double wishbone) type.

The body frame 4 has a frame body 4a which extends in a substantially front-rear direction of the vehicle body, and a sub-frame 60 which is coupled to a rear portion of the frame body 4a. The frame body 4a is formed by coupling a plurality of kinds of steel material to each other by welding or the like, and forms a pair of closed-loop structures which are constituted mainly by a pair of left and right upper pipes 41 and a pair of left and right lower pipes 42. The upper pipes 41 and the lower pipes 42 are then coupled to each other through a plurality of cross members. A box structure that extends in the front-rear direction is accordingly formed in the middle portion of the vehicle-width direction. Each upper pipe 41 includes an upper horizontal part 41a which extends in a substantially horizontal direction to the front and rear of the vehicle body, and a front inclined part 41b which extends obliquely downwardly to the front from a front end of the upper horizontal part 41a. Each lower pipe 42 includes a lower horizontal part 42a which is coupled to a lower end of the front inclined part 41b of the upper pipe 41 to extend in a substantially horizontal direction to the front and rear of the vehicle body, and a rear inclined part 42b which extends diagonally upwardly from a rear end of the lower horizontal part 42a so as to form an obtuse angle with the lower horizontal part 42a. A middle portion of the front inclined part 41b of each upper pipe 41 is coupled to a middle portion of the lower horizontal part 42a of each lower pipe 42 through a front coupling inclined part 46 which is inclined downwardly to the rear. A rear portion of the upper horizontal part 41a of each upper pipe 41 is coupled to an upper end of the rear inclined part 42b of each lower pipe 42 through a rear coupling inclined part 62 which is bent in a substantially S shape, and the sub-frame 60 is coupled to a lower end of the rear coupling inclined part 62. The sub-frame 60 extends vertically downwardly, and then extends forward after being bent at a substantially right angle so as to be coupled to a lower portion of the rear inclined part 42b of each lower pipe 42.

A front lower pipe 45 is coupled to the vicinity of a front end of the lower horizontal part 42a of each lower pipe 42, and extends to the front of the vehicle body. To a front end of each front lower pipe 45, there is coupled a front protector 34, which also serves as a carrier pipe supporting a front carrier 35. A step bar 56 is provided to the lower horizontal part 42a of each lower pipe 42, and the step bar 56 and a step board (not shown) underneath the step bar 56 configure a step for driver.

To front ends of the front lower pipes 45, there are coupled the above-described left and right front inclined parts 41b, each of which extends obliquely upwardly to the rear, and an upper end of each front inclined part 41b is continued to a front end of each upper pipe 41. The front inclined parts 41b and the front coupling inclined parts 46 are coupled to each other through a pair of left and right front sub-pipes 47 which are inclined slightly upwardly to the front. A cross member 51 is provided in a crossing manner between the left and right front inclined parts 41b, and cross members 53 and 54 are provided in a crossing manner between the left and right front lower pipes 45 while providing an interval therebetween in the front-rear direction. Further, a cross member 52 is provided in a crossing manner between the left and right front sub-pipes 47. The frame rigidity around the front can be sufficiently secured by the cross members 51 to 54, and the cross members 52, 53, 54, and the like also serve as supporting members which support a final reduction apparatus 11. Each of the cross members 51 to 54 is formed in such a manner that the cross section thereof has a substantially C shape which is open downwardly, and front and rear portions on the proximal side of a pair of left and right upper arms (not shown) are journaled, in a vertically swingable manner, to both side portions of the cross members 51 and 52 located on the upper side among the cross members 51 to 54. Front and rear portions on the proximal side of a pair of left and right lower arms (not shown) are journaled, in a vertically swingable manner, to both side portions of the cross members 53 and 54 located on the lower side. A pair of left and right knuckles (not shown) are journaled, in a vertically swingable manner, to the tip-end sides of both upper arms and lower arms, and hub parts for the left and right front wheels 2 are rotatably supported by both knuckles, and a pair of left and right front shock absorbers 58 are inserted between the left and right lower arms and a cross member 55, so that these components configure the front suspension 57.

The rear inclined parts 42b of the lower pipes 42 and the rear coupling inclined parts 62 which are bent in a substantially S shape are coupled to each other through a pair of left and right rear sub-pipes 63 which extend in a substantially horizontal direction. The sub-frame 60 forms a pair of left and right closed-loop structures which are formed mainly by a pair of left and right sub lower pipes 61 and rear members, each of which is continued to a rear end of each sub lower pipe 61 to extend vertically upwardly, and these are coupled to each other through a plurality of cross members, so that a box structure that continues to a rear portion of the frame body 4a is formed in the middle portion of the vehicle-width direction. A cross member 69 is provided in a crossing manner between the rear sub-pipes 63, and a cross member 67 is provided in a crossing manner between the middle portions of the sub lower pipes 61 of the sub-frame 60. Further, a cross member 68 is provided in a crossing manner between the vicinities of lower ends of the rear members 64, and a cross member 70 is provided in a crossing manner between the middle portions of the rear coupling inclined parts 62. Each of the cross members 67 to 70 is formed in such a manner that the cross section thereof has a substantially C shape which is open downwardly, and the frame rigidity around the front can be sufficiently secured by these members.

Front and rear portions on the proximal side of a pair of left and right upper arms (not shown) are journaled, in a vertically swingable manner, to both side portions of the cross member 68 and both side portions on the upper side of the rear members 64. Front and rear portions on the proximal side of a pair of left and right lower arms (not shown) are journaled, in a vertically swingable manner, to both side portions on the lower side of the cross member 67 and rear members 64. A pair of left and right knuckles (not shown) are journaled, in a vertically swingable manner, to the tip-end sides of both upper arms and lower arms, hub parts for the left and right rear wheels 3 are rotatably supported by both knuckles, and a pair of left and right rear shock absorbers 79 are inserted between the left and right lower arms and both side portions of the cross member 70, so that these components configure the rear suspension 75.

In this configuration, an engine 5 as a power plant of, for example, a water-cooled two-cylinder engine that is mounted substantially in the middle of the body frame 4. The engine 5 includes a crankcase 6 which journals a crankshaft and the like, and a cylinder part 7 which is coupled to an upper portion of the crankcase 6, and is vertically laid out in such a manner that a rotational axis line of the crankshaft is directed in the front-rear direction of the vehicle. The crankcase 6 also serves as a transmission case accommodating a transmission. A transmission shaft 8 for the front wheels and a transmission shaft 9 for the rear wheels which are coupled to the transmission in the crankcase 6 are derived from the front and rear of the crankcase 6 toward the front and rear, respectively.

The transmission shafts 8 and 9 are connected to the front wheels 2 and rear wheels 3 on the front lower side and the rear lower side of the body frame 4 so that power can be transmitted thereto through a front-wheel-side final reduction apparatus 11 and a rear-wheel-side final reduction apparatus 12, and drive shafts 13 and 14 which extend to the left and right of the final reduction apparatuses 11 and 12, respectively. A rotational power from the engine 5 is transmitted to the respective transmission shafts 8 and 9 through the transmission in the crankcase 6, and then is transmitted to the front wheels 2 and rear wheels 3 through the respective final reduction apparatuses 11 and 12, and the respective drive shafts 13 and 14. The front-wheel-side final reduction apparatus 11 incorporates therein a differential mechanism, and absorbs a rotational difference between the left and right front wheels 2 and 2.

A cylinder head part 20 is connected to an upper portion of the cylinder part 7 of the engine 5. A throttle body 21 is provided above the cylinder head part 20, and an air cleaner case 22 is connected to a front portion of the throttle body 21. These components configure an air intake system of the engine 5. Two exhaust pipes 23 corresponding to two cylinders of the engine 5 are connected to a left side face of the cylinder part 7 of the engine 5. The exhaust pipes 23 extend to the left from the left side face of the cylinder part 7, and then are bent to extend ahead of the engine over the cylinder part 7. Thereafter, the exhaust pipes 23 turn back to the rear after being bent again to the left around immediately below a front end of the air cleaner case 22, and are merged into a junction pipe 26 located on the left side of the boundary between the crankcase 6 and the cylinder part 7 so as to extend to the rear. Thereafter, the junction pipe 26 is connected to a muffler 24 which is arranged in a rear portion of the vehicle body so that its tip end is directed diagonally upwardly, and these components configure an exhaust system of the engine 5.

In the middle of the body frame 4 in the vehicle-width direction, there are arranged, in the order starting from the front of the vehicle body, a radiator 25 for cooling the engine, a blower fan 25a, a shroud 25b, the front shock absorber 58, a steering shaft 27, the air cleaner case 22, the throttle body 21, a saddle-ride type seat 29, and a fuel tank 28. A bar-type handlebar 30 which is located obliquely upwardly from the air cleaner case 22 is attached to an upper end of the steering shaft 27, and an electric power steering mechanism 91 and a front wheel steering mechanism 31 are coupled to a lower end of the steering shaft 27. In the electric power steering mechanism 91, an electric power mechanism part 91a protrudes to the rear, and is arranged opposite to bent parts 23a of the exhaust pipes 23 which protrude ahead of the engine 5.

At a front portion of the body frame 4, a body cover 32 made of resin is provided to cover a front portion of the vehicle body including the air cleaner case 22 and the throttle body 21 from above. A front fender 33 made of resin is provided to cover both the front wheels 2 from above to the rear. The front protector 34 and the front carrier 35 are both made mainly of a steel material. Further, at a rear portion of the body frame 4, a rear fender 36 made of resin is provided to cover both rear wheels 3 from the front to the above. A rear carrier 37 is made mainly of a steel material.

In this configuration, the engine 5 is located between the front wheels 2 and the rear wheels 3 suspended by the body frame 4. The center (substantially the middle between the cylinders) of the cylinder part 7 of the engine 5 is provided so as to be located nearer the front wheels 2. In the saddle-ride type vehicle, when the position of the seat 29 is determined, the arrangement lay-out of the engine 5 is accordingly determined. This is because a seated portion of the seat 29 is low and the engine 5 is arranged forward relative to the seated portion.

The engine 5 includes the crankcase 6 and the cylinder part 7 which is overhung upward from the crankcase 6, and the crankshaft which extends in the front-rear direction of the vehicle body is provided to the crankcase 6. An ACG 100 is connected to a front end of the crankshaft, and a power transmission system member 200 including a torque converter and the like is connected to a rear end of the crankshaft. More specifically, in this configuration, the engine 5 is arranged in such a manner that the ACG 100 is directed to the front of the vehicle body, and the power transmission system member 200 is directed to the rear of the vehicle body. Further, the front-wheel-side final reduction apparatus 11 is located on the front side of the engine 5, and the rear-wheel-side final reduction apparatus 12 is located on the rear side of the engine 5. Distances from the engine 5 to the respective final reduction apparatuses are set in such a manner that a distance to the rear-wheel-side final reduction apparatus 12 is longer than that to the front-wheel-side final reduction apparatus 11.

The ACG 100 and the power transmission system member 200 are overhung in the front-rear direction relative to the engine cylinder part 7, and a width W1 by which the power transmission system member 200 is overhung to the rear is larger than a width W2 by which the ACG 100 is overhung to the front. A heavyweight oil tank 92 for preserving engine oil is provided above the power transmission system member 200 which is overhung to the rear. A battery 93 is arranged above the oil tank 92.

Figure 3:
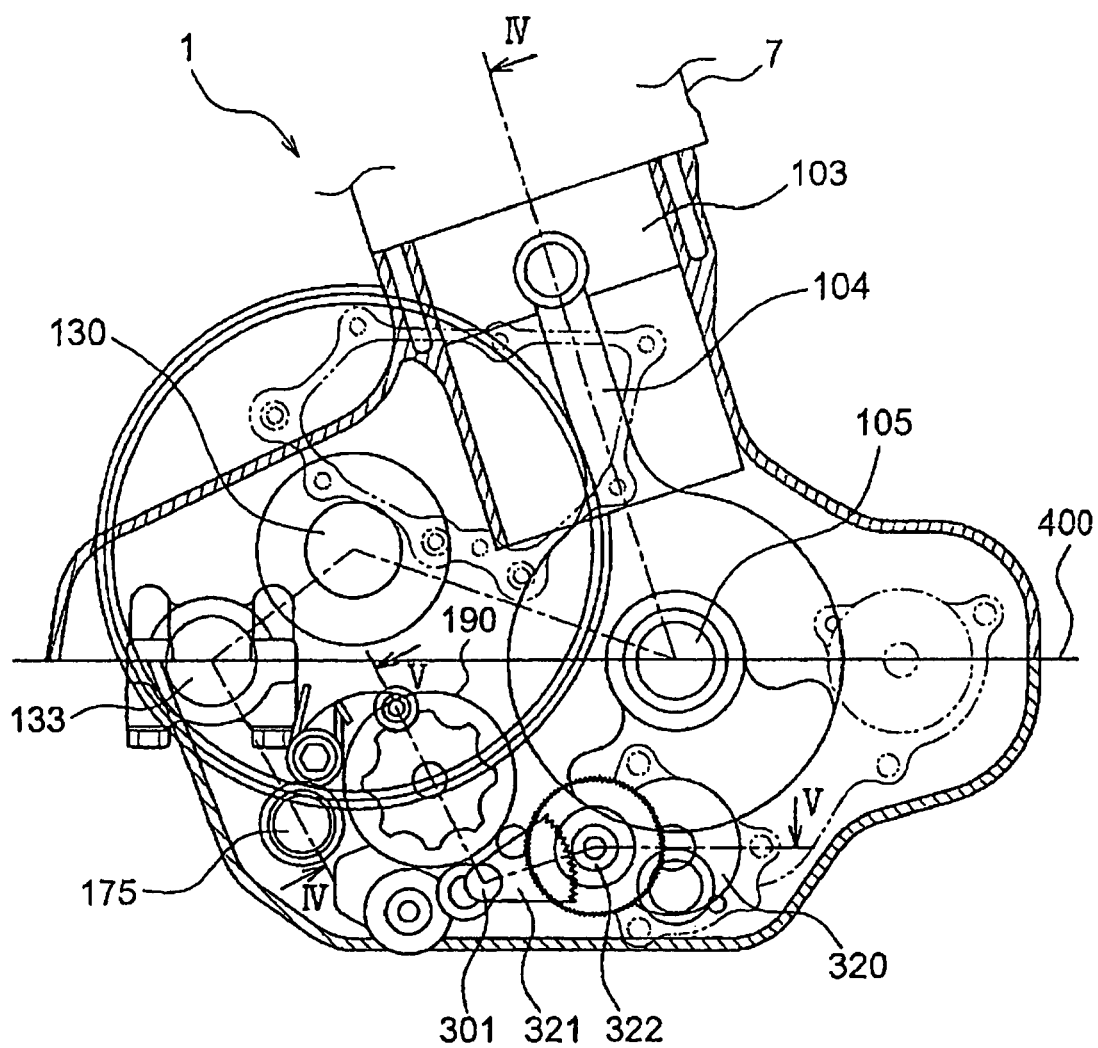
FIG. 3 is a layout view of main components of an engine.
Figure 4:
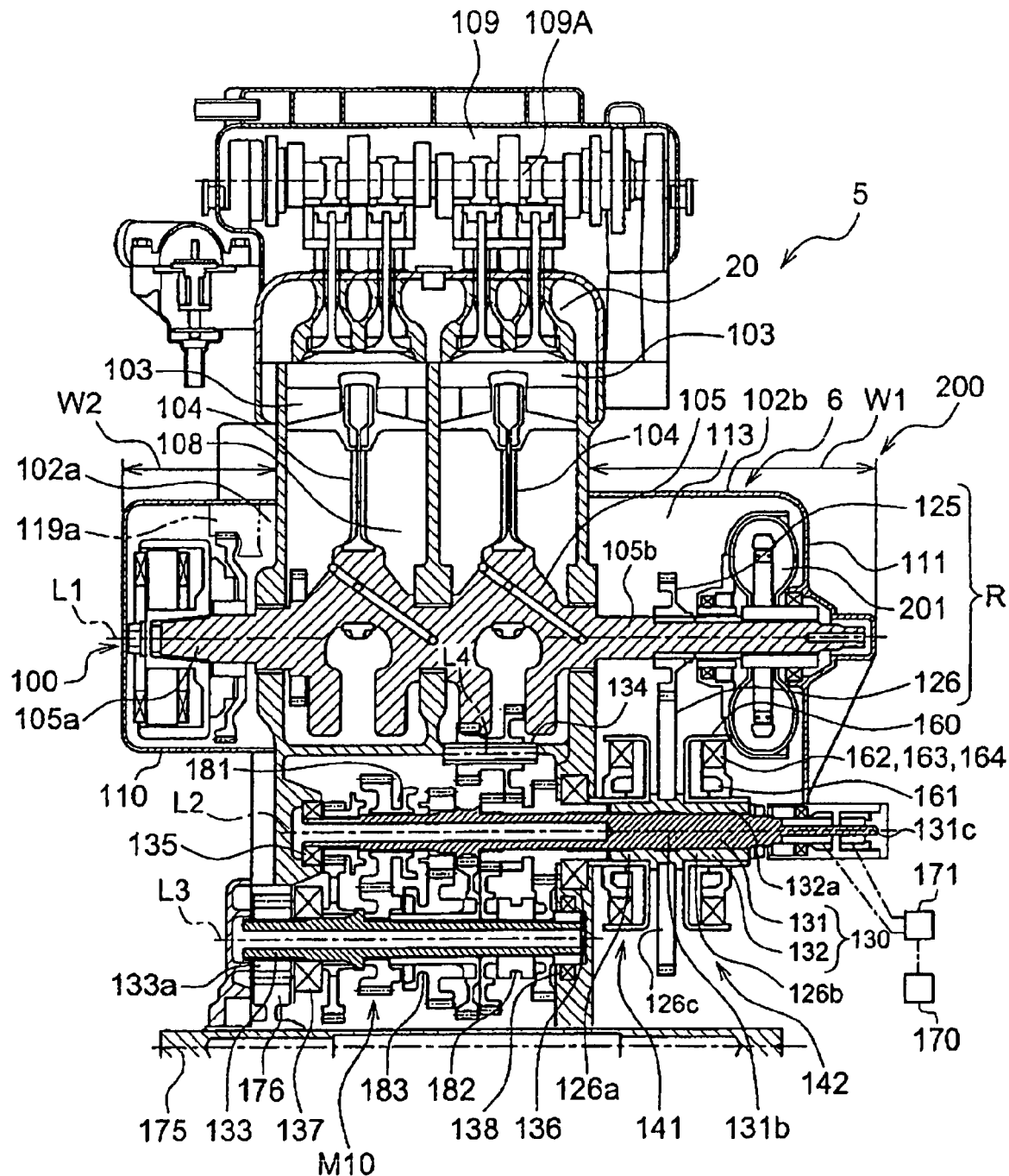
FIG. 4 is a schematic cross sectional view taken along the line IV-IV of FIG. 3.

Next, a structure of the engine 5 will be described with reference to FIGS. 3 and 4. FIG. 3 is schematic cross sectional view of the engine, and FIG. 4 is a cross sectional view taken along the line IV-IV of FIG. 3.

The engine 5 according to this configuration is a water-cooled, two-cylinder, four-stroke internal combustion engine. As shown in FIG. 3, the crankcase 6 is configured so as to be divided into upper and lower portions at the boundary of an upper/lower dividing face 400, and a crankshaft 105 is rotatably supported so as to be sandwiched by the upper and lower portions. A connecting rod 104 is provided to which a piston 103 is coupled. The piston 103 is slidable in a bore of the cylinder part 7. As shown in FIG. 4, a rotational center line L1 of the crankshaft 105 is directed in the front-rear direction of the vehicle body, and the crankcase 6 is divided into two in the axis direction which is the direction of the rotational center line L1. The crankcase 6 is configured by coupling two case half bodies 102a and 102b, that is, a front case half body 102a and a rear case half body 102b to each other. A crank chamber 108, in which crank parts of the crankshaft 105 are accommodated, is formed inside the crankcase 6.

The engine 5 includes an intake valve and an exhaust valve which respectively opens and closes an intake port and an exhaust port provided in the cylinder hear part 20. An overhead-valve-type valve apparatus 109 is provided for opening and closing these intake and exhaust valves through a push rod driven by a valve cam of a cam shaft 109A, in synchronization with the rotation of the crankshaft 105. An air-fuel mixture taken in from the intake port is combusted in a combustion chamber formed between the piston 103 and the cylinder head part 20. The piston 103 is driven by combustion pressure. The crankshaft 105 is rotatably driven through the connecting rod 104. The crankshaft 105 as an output shaft of the engine 5 includes a front extension part 105a and a rear extension part 105b which extend to the front and rear from the crank chamber 108, respectively.

A front cover 110 for covering the front case half body 102a from the front is coupled to the front case half body 102a. A front accommodation chamber 112 is formed by the front case half body 102a and the front cover 110. The front extension part 105a extends in the front-rear direction in the front accommodation chamber 112. A rear cover 111 for covering the rear case half body 102b from the rear is coupled to the rear case half body 102b. A rear accommodation chamber 113 is formed by the rear case half body 102b and the rear cover 111. The rear extension part 105b extends in the front-rear direction in the rear accommodation chamber 113.

To the front extension part 105a of the crankshaft 105 in the front accommodation chamber 112, the alternating current generator (ACG) 100 and a starter driven gear 119 from the shaft end side are connected. The starter driven gear 119 is meshed with a gear 119a, and the gear 119a is meshed with an output gear of a starter motor (not shown). The starter driven gear 119 configures a starter speed reducing mechanism which transmits the rotation of the starter motor to the crankshaft 105. The starter speed reducing mechanism is supported by the front cover 110. The ACG 100 generates an alternating electric power by using the power of the crankshaft 105, and the alternating electric power is converted into a direct current to be accumulated in the above-described battery 93. In this configuration, the ACG 100 is brought closer to the battery 93, so that an electric wire can be easily arranged therebetween.

To the rear extension part 105b of the crankshaft 105, a torque converter 201 and a drive gear 125 in the rear accommodation chamber 113 are connected sequentially from the shaft end side.

The torque converter 201 is located between the engine 5 and the transmission. The inside of the torque converter 201 is filled with an oil. The torque converter 201 mainly includes a pump part, a turbine part, and a stator. The pump part and the turbine part include blades, and the power of the engine 5 is transmitted to the drive gear 125 by rotating the blades. The drive gear 125 is meshed with a driven gear 126 having a damper which suppresses a rotational fluctuation of the crankshaft 105. The drive gear 125 and the driven gear 126 configure a primary speed reducing mechanism R.

The transmission M includes the driven gear 126, and the driven gear 126 is provided to a main shaft 130 while being relatively rotatable therewith. The main shaft 130 includes a first main shaft 131 and a second main shaft 132, and the first main shaft 131 coaxially penetrates a hollow part of the second main shaft 132 while being relatively rotatable therewith. The first main shaft 131 is rotatably supported through bearings 135 and 136, and has a rotational center line L2 parallel to the rotational center line L1 of the crankshaft 105. To an outer shaft part 131b of the first main shaft 131, a second speed-change clutch 142, the driven gear 126, and a first speed-change clutch 141 from a shaft end part 131c are sequentially provided toward the crank chamber 108. The driven gear 126 is arranged between both speed-change clutches 141 and 142 in the shaft direction of the main shaft 130. The first and second speed-change clutches 141 and 142 (twin speed-change clutch) are coupled to the driven gear 126. The driven gear 126 has a pair of front and rear coupling parts 126a and 126b which are boss parts, extending in the front-rear direction across a disk part 126c in a disk shape at an outer circumference of the first main shaft 131. Power is transmitted to the first and second speed-change clutches 141 and 142 through the front coupling part 126a and the rear coupling part 126b, respectively. The primary speed reducing mechanism R including the driven gear 126 is a transmission mechanism through which power from the torque converter 201 is transmitted to the first and second speed-change clutches 141 and 142.

The torque converter 201, and the first and second speed-change clutches 141 and 142 configure the power transmission system member 200.

The first speed-change clutch 141 is spline-fitted to the front coupling part 126a while being integrally rotatable therewith, and is spline-fitted to the outer shaft part 131b while being integrally rotatable therewith on the side where the power is output to the first main shaft 131. The second speed-change clutch 142 is spline-fitted to the rear coupling part 126b while being integrally rotatable therewith, and is spline-fitted to a front shaft end part 132a while being integrally rotatable therewith on the side where the power is output to the second main shaft 132. Both of the speed-change clutches 141 and 142 are hydraulic multi-disk friction clutches with the same structure. Each of the speed-change clutches 141 and 142 includes a bowl-shaped clutch outer 160, as an input member, which is spline-fitted to an outer circumference of the front coupling part 126a or the rear coupling part 126b while being integrally rotatable therewith. A plurality of first clutch disks 162 are meshed with the clutch outer 160 while being integrally rotatable therewith. A plurality of second clutch disks 163 are laminated alternately with the first clutch disks 162. A clutch inner 161, as an output member, is meshed with the second clutch disk 163 while being integrally rotatable therewith. A piston 164 is slidably fitted to the clutch outer 160 to press the first and second clutch disks 162 and 163 so as to be brought in contact with each other.

In the respective speed-change clutches 141 and 142, hydraulic chambers (not shown) are formed by the clutch outers 160 and the pistons 164. The hydraulic chamber of the first speed-change clutch 141 is arranged nearer the second speed-change clutch 142 in the axis direction, and the hydraulic chamber of the second speed-change clutch 142 is arranged nearer the first speed-change clutch 141 in the axis direction. Accordingly, the first and second speed-change clutches 141 and 142 are arranged back-to-back so that the respective hydraulic chambers come closer to each other in the axis direction. Hydraulic oil is supplied to and discharged from each of the hydraulic chambers through a hydraulic passage (not shown) provided in the front cover 110 and the front extension part 105a. When hydraulic pressure in the hydraulic chambers becomes high, the pistons 164 press the first clutch disks 162 to the second clutch disks 163 against a spring force of a return spring (not shown), and the clutch outers 160 and the clutch inners 161 are integrally rotated (engaged state) by friction between both clutch disks 162 and 163. When a hydraulic pressure in the hydraulic chambers becomes low, both clutch disks 162 and 163 are separated from each other by a spring force of the return spring, and the power transmission between the clutch outers 160 and the clutch inners 161 is interrupted (disengaged state).

The pressure of the hydraulic oil in the hydraulic chambers is controlled by a hydraulic pressure control apparatus by using a hydraulic pump driven by the crankshaft 105 as a hydraulic source. The hydraulic pressure control apparatus includes a control valve unit 171. The control valve unit 171 controls a discharge pressure of the hydraulic pump driven by the crankshaft 105. The control valve unit 171 includes a plurality of hydraulic pressure control valves. The hydraulic pressure control valves are controlled by an electronic control unit 170, the supply and discharge of the hydraulic oil to/from the hydraulic chambers are controlled through a hydraulic passage provided in the first main shaft 131, and the engagement and disengagement, that is, the engaged/disengaged state of the respective speed-change clutches 141 and 142 is controlled.

In this configuration, the power from the primary speed reducing mechanism R is transmitted to the respective clutch outers 160 of the first speed-change clutch 141 and the second speed-change clutch 142. When the first speed-change clutch 141 is engaged, the power from the primary speed reducing mechanism R is transmitted to the first main shaft 131 through the clutch inner 161 of the first speed-change clutch 141. On the other hand, when the second speed-change clutch 142 is engaged, the power from the primary speed reducing mechanism R is transmitted to the second main shaft 132 through the clutch inner 161 of the second speed-change clutch 142. The first main shaft 131 and the second main shaft 132 extend in the crank chamber 108 that serves also as the transmission chamber. In addition to the first main shaft 131 and the second main shaft 132, a counter shaft 133 having a rotational center line L3 parallel to the rotational center line L2 of the first main shaft 131 is arranged in the crank chamber 108. The front shaft end part 132a of the counter shaft 133 is supported by a bearing 137, and a rear shaft end part 133b thereof is supported by a bearing 138. As similar thereto, a reverse idle shaft 134 having a rotational center line L4 parallel to the rotational center line L3 of the counter shaft 133 is arranged in the crank chamber 108.

Figures 5A, 5B:
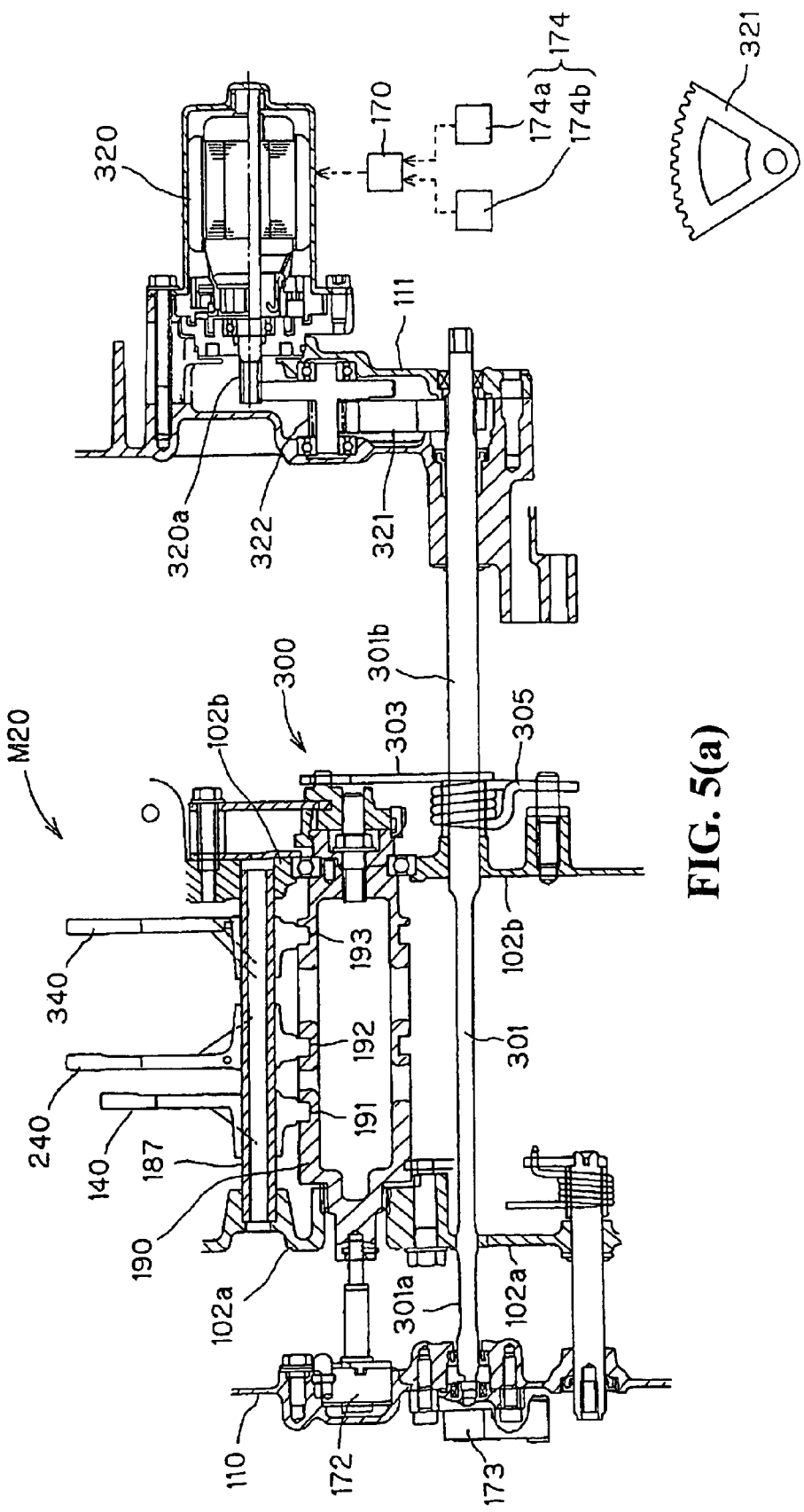
FIGS. 5(a) and 5(b) are schematic cross sectional views taken along the line V-V of FIG. 3.

A speed change gear train group M10 as a group of speed change elements is arranged on the first main shaft 131, the second main shaft 132, the counter shaft 133, and the reverse idle shaft 134. The speed change gear train group M10 includes speed change gear trains for first to fifth speeds, and speed change gear trains for reverse, and these speed change gears are shifted using a selection mechanism M20 (see FIG. 5). When one of the speed change gears is shifted to another, the power of the crankshaft 105 is transmitted to the main shaft 130 through the primary speed reducing mechanism R, and then is transmitted to the counter shaft 133 through the speed change gear train group M10. The counter shaft 133 protrudes forward from the bearing 137, and an output drive gear 133a is provided at a front shaft end of the counter shaft 133. The output drive gear 133a is meshed with an output driven gear 176, and the output driven gear 176 is provided on a drive shaft 175. The drive shaft 175 is rotatably supported by the front case half body 102a and the rear case half body 102b through bearings. The output drive gear 133a, together with the output driven gear 176 provided on the drive shaft 175, configures a secondary speed reducing mechanism of a transmission mechanism which reduces the power from the transmission M to transmit the reduced speed to the drive shaft 175.

As shown in FIG. 5, the above-described selection mechanism M20 includes shift forks 140, 240, and 340. The shift forks 140, 240, and 340 are slidably supported by a spindle 187, and the spindle 187 is supported by the front case half body 102a and the rear case half body 102b. Base parts of the shift forks 140, 240, and 340 are respectively fitted to cam grooves 191 to 193 provided on an outer circumferential face of a shift drum 190. When the shift drum 190 is intermittently rotated by an intermittent feeding mechanism 300, the shift forks 140, 240, and 340 are moved in the axis direction in accordance with cam profiles of the cam grooves 191 to 193. With reference to FIG. 4, the shift forks 140, 240, and 340 are engaged with groove parts of a first shifter 181 to a third shifter 183 arranged on the main shaft 130 or the counter shaft 133. When the shift forks are moved in the axis direction, the shifters 181 to 183 are accordingly moved in the axis direction.

The intermittent feeding mechanism 300 includes a shift spindle 301 which rotatably penetrates both case half bodies 102*a* and 102*b* in the front-rear direction. The shift spindle 301 protrudes forward from the front case half body 102*a*, and a front end part 301*a* of the shift spindle 301 is rotatably supported by the front cover 110. The front cover 110 is provided with a rotational position detector 172 which detects a rotational position of the shift drum 190, and a rotational position detector 173 which detects a rotational position of the shift spindle 301. A rear end part 301*b* of the shift spindle 301 penetrates the rear case half body 102*b* and the rear cover 111 so as to be rotatably supported thereby. A fan-shaped gear 321 (see FIG. 5B) is coupled to the rear end part 301*b* inside the rear cover 111. A gear 322 is meshed with the fan-shaped gear 321. In addition, an output gear 320*a* of an electric motor 320 is coupled to the gear 322. The intermittent feeding mechanism 300 includes a change arm 303. The change arm 303 allows the rotational power of the shift spindle 301 to be transmitted to the shift drum 190. When the shift spindle 301 is rotated, the shift drum 190 is accordingly rotated. The change arm 303 can be rotated relative to the shift spindle 301. When the change arm 303 is rotated by a predetermined amount, the change arm 303 is pushed back by a return spring 305 to return to a neutral position. The return spring 305 is wound around an outer circumferential part of the shift spindle 301.

When the electric motor 320 is driven to rotate the shift spindle 301 in either a positive or negative direction in the selection mechanism M20, the change arm 303 provided on the shift spindle 301 is allowed to rotate in either a positive or negative direction, and the shift drum 190 is accordingly allowed to rotate in either of positive or negative direction. When the change arm 303 returns to the neutral position, the change arm 303, together with the shift spindle 301, is rotated in the reverse direction by a spring force of the return spring 305. In the course of rotation of the shift drum 190 by a predetermined angle, the intermittent feeding mechanism 300 performs the following operations the shift forks 140, 240, and 340 are moved in the axis direction in accordance with cam profiles of the cam grooves 191 to 193, any one of the first shifter 181 to the third shifter 183 in FIG. 4 is accordingly moved in the axis direction, a combination of gears of the speed change gear train group M10 is changed, and the gear is shifted to any one of the first to fifth speeds, and reverse.

The electronic control unit 170 controls the engaged/disengaged state of the first and second speed-change clutches 141 and 142 by controlling the hydraulic pressure control valves as described above. In addition, the electronic control unit 170 is connected to the electric motor 320 to control its rotational amount and rotational direction. To the electronic control unit 170, signals from operational state detecting means 174 for detecting an operational state of the engine 5 and the vehicle, and both rotational position detectors 172 and 173 are input. The operational state detecting means 174 includes vehicle speed detecting means 174*a* and accelerator opening degree detecting means 174*b* for detecting the load of the engine 5, and the electronic control unit 170 rotatably drives the shift spindle 301 on the basis of the signal from the operational state detecting means 174 to automatically control a shift position of the transmission M in accordance with an operational state.

The electronic control unit 170 feedback-controls a rotational position of the shift spindle 301 on the basis of an rotational position detected by the rotational position detector 173, thereby controlling a rotational speed of the shift spindle 301 which changes in accordance with the rotational position. As an optional apparatus for controlling a shift position of the transmission M, shift switches such as a shift-up switch and a shift-down switch provided on the handlebar of the vehicle may be provided as a speed-change operation unit to which a shift position instructed by a driver is input. In this case, the electronic control unit 170 to which a signal from the shift switches is input controls an operation of the electric motor 320 in accordance with the signal from the shift switches, and controls the rotation of the shift drum 190 through the shift spindle 301 and the intermittent feeding mechanism 300.

In the embodiment, the ACG 100 with a small overhung width W2 is overhung ahead of the engine, and the power transmission system member 200 with a large overhung width W1 is overhung behind the engine in accordance with the engine configuration. Accordingly, without displacing the engine to the rear of the vehicle body and changing the vehicle configuration, an available space can be secured ahead of the engine, and mechanism members accommodated in the front space can be easily laid out. In this configuration, the electric power steering mechanism 91 which includes the electric power mechanism part 91*a* overhung to the rear of the vehicle body is coupled to a lower end of the steering shaft 27. In this case, an available space can be obtained ahead of the engine, and accordingly the electric power steering mechanism 91 can be easily laid out. The exhaust pipes of the engine extend ahead of the engine, and then extend to the rear of the vehicle body. However, an available large space can be secured ahead of the engine, and accordingly the exhaust pipes of the engine can be easily laid out. The center (substantially the middle between the cylinders) of the cylinder part 7 of the engine 5 is located nearer the front wheels 2, so that an available space can be obtained even behind the engine, and the large-size fuel tank 28 as well as the heavyweight components such as the oil tank 92 and the battery 93 can be easily laid out. Distances from the engine 5 to the respective final reduction apparatuses 11 and 12 are set in such a manner that a distance to the rear-wheel-side final reduction apparatus 12 is longer than that to the front-wheel-side final reduction apparatus 11, so that a space on the rear side where a distance from the engine is longer becomes larger, as compared to the front side. Accordingly, even when the power transmission system member 200 is largely overhung, the space allows the power transmission system member 200 to be securely accommodated. The oil tank 92 for preserving engine oil is provided above the power transmission member behind the engine on the rear side of the vehicle body and the battery 93 is arranged thereabove, so that a space above the power transmission member can be effectively used. Thus, heavyweight components can be accommodated at the center of the vehicle.

The present invention has been described above on the basis of the embodiment. However, the present invention is not limited thereto. For example, the engine may be a single-cylinder internal combustion engine. The engine may be an internal combustion engine or a power plant other than an internal combustion engine which includes a piston that moves in a reciprocating manner. The guide parts of the shift drum may be guide parts other than the cam grooves, for example, convex stripes. The selection means may be of a manual type by which the shift drum is rotatably driven by a direct operation of a driver. Together with the engine, the power transmission apparatus for vehicle to which the present invention is applied configures a power unit mounted in an all terrain saddle-ride type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine arrangement structure of a saddle-ride type vehicle comprising:
   a body frame for suspending an engine;
   a steering system member supported by the body frame and having a handlebar and a steering shaft;
   the engine includes a crankcase and a cylinder part mounted upwardly from the crankcase;
   a crankshaft extending in a front-rear direction of a vehicle body is provided in the crankcase;
   an alternating current generator operatively connected at one end of the crankshaft;
   a torque converter of a power transmission system operatively connected at the other end thereof, the alternating current generator and the power transmission system member are overhung ahead of and behind the engine relative to the engine cylinder part, respectively;
   a width by which the torque converter is overhung is larger than that by which the alternating current generator is overhung; and
   a seat located behind the engine cylinder part and mounted on the body frame;
   wherein the alternating current generator of the engine is arranged so as to be directed to the front of the vehicle body and the torque converter is arranged so as to be directed to the rear of the vehicle body, and further comprising:
   an oil tank for preserving engine oil arranged directly above the torque converter behind the engine on the rear side of the vehicle body, and
   a battery arranged directly above the oil tank and under a seat mounted on the body frame,
   wherein the engine is located between front wheels and rear wheels suspended by the body frame, and is provided nearer the front wheels,
   wherein the engine is a two cylinder engine and both cylinders slant toward a lateral side of the vehicle body which is opposite to the lateral side where the exhaust pipes extend toward the rear,
   wherein a front-wheel-side final reduction apparatus is provided ahead of the engine and a rear-wheel-side final reduction apparatus is provided behind the engine, and distances from the engine to the respective final reduction apparatuses are set in such a manner that a distance to the rear-wheel-side final reduction apparatus is longer than that to the front-wheel-side final reduction apparatus, which provides a space directly behind the engine for accommodating heavy components, including the oil tank and the battery, and a fuel tank which is arranged directly behind the battery.

2. The engine arrangement structure of a saddle-ride type vehicle according to claim 1, wherein the fuel tank extends rearwardly over the rear-wheel-side final reduction apparatus.

3. The engine arrangement structure of a saddle-ride type vehicle according to claim 1, wherein an electric power steering mechanism is provided at the steering shaft part of the steering system member.

4. An engine arrangement structure of a saddle-ride type vehicle comprising:
   a body frame for suspending an engine, said engine including a crankcase and a cylinder part mounted upwardly from the crankcase;
   a crankshaft extending in a front-rear direction of the body frame and operatively mounted within the crankcase;
   an alternating current generator operatively connected at one end of the crankshaft and extending from the engine in the front direction of the body frame, the alternating current generator being housed immediately inside a front cover fixed to a front side of the crankcase, the alternating current generator and the front cover directly facing each other in the front-rear direction of the vehicle body;
   a power transmission system member operatively connected at the other end of the crankshaft and extending from the engine in the rear direction of the body frame, the power transmission system member being housed in a rear cover fixed to a rear side of the crankcase;
   wherein a distance W1 by which the rear cover extends away from the cylinder part in the rear direction is larger than a distance W2 by which the front cover extends away from the cylinder part in the front direction,
   wherein the engine is a two cylinder engine and both cylinders slant toward either a left or a right lateral side of the vehicle body, and
   the engine is provided with exhaust pipes, extending ahead of the engine and above the alternating current generator, and then extending to the rear of the body frame along the other of the left and the right lateral side of the vehicle body, further comprising:
   an oil tank for preserving engine oil arranged directly above the power transmission system member behind the engine on the rear side of the body frame,
   a battery is arranged directly above the oil tank and under a seat located behind the engine cylinder part, and
   a fuel tank arranged directly behind the battery.

5. The engine arrangement structure of a saddle-ride type vehicle according to claim 4, wherein the engine is located between front wheels and rear wheels suspended by the body frame, and is provided nearer the front wheels.

6. The engine arrangement structure of a saddle-ride type vehicle according to claim 4, wherein a front-wheel-side final reduction apparatus is provided ahead of the engine and a rear-wheel-side final reduction apparatus is provided behind the engine, and distances from the engine to the respective final reduction apparatuses are set in such a manner that a distance to the rear-wheel-side final reduction apparatus is longer than that to the front-wheel-side final reduction apparatus, which provides a space directly behind the engine for accommodating heavy components, including the oil tank and the battery, and a fuel tank which is arranged directly behind the battery.

7. The engine arrangement structure of a saddle-ride type vehicle according to claim 6, wherein the fuel tank extends rearwardly over the rear-wheel-side final reduction apparatus.

8. The engine arrangement structure of a saddle-ride type vehicle according to claim 4, wherein an electric power steering mechanism is provided at the steering shaft part of the steering system member.

9. An engine arrangement structure of a saddle-ride type vehicle comprising:
- a body frame for suspending an engine, said engine including a crankcase and a cylinder part mounted upwardly from the crankcase;
- a crankshaft extending in a front-rear direction of the body frame and operatively mounted within the crankcase;
- an alternating current generator operatively connected at one end of the crankshaft and extending a predetermined distance from the engine in the front direction of the body frame, the alternating current generator being housed immediately inside a front cover extending from a front side of the crankcase, the alternating current generator and the front cover directly facing each other in the front-rear direction of the vehicle body; and
- a torque converter of a power transmission system operatively connected at the other end of the crankshaft and extending a predetermined distance from the engine in the rear direction of the body frame, the torque converter being housed in a rear cover extending from a rear side of the crankcase;
- wherein a distance W1 by which the rear cover extends away from the cylinder part in the rear direction is larger than a distance W2 by which the front cover extends away from the cylinder part in the front direction,
- wherein a front-wheel-side final reduction apparatus is provided ahead of the engine and a rear-wheel-side final reduction apparatus is provided behind the engine, and distances from the engine to the respective final reduction apparatuses are set in such a manner that a distance to the rear-wheel-side final reduction apparatus is longer than that to the front-wheel-side final reduction apparatus, which provides a space directly behind the engine for accommodating heavy components, including the oil tank and the battery, and a fuel tank which is arranged directly behind the battery.

10. The engine arrangement structure of a saddle-ride type vehicle according to claim 9, wherein the engine is located between front wheels and rear wheels suspended by the body frame, and is provided nearer the front wheels.

11. The engine arrangement structure of a saddle-ride type vehicle according to claim 9, wherein the fuel tank extends rearwardly over the rear-wheel-side final reduction apparatus.

12. The engine arrangement structure of a saddle-ride type vehicle according to claim 9, wherein an electric power steering mechanism is provided at the steering shaft part of the steering system member.

13. The engine arrangement structure of a saddle-ride type vehicle according to claim 9, wherein the engine is provided with exhaust pipes, extending ahead of the engine and above the alternating current generator, and then extending to the rear of the body frame along a lateral side of the vehicle body.

14. The engine arrangement structure of a saddle-ride type vehicle according to claim 1, and further comprising:
- exhaust pipes, extending ahead of the engine and then extending to the rear of the vehicle body,
- wherein the exhaust pipes include two exhaust pipes corresponding to two cylinders of the engine, and are connected to a left side face of the cylinder part of the engine,
- wherein the exhaust pipes extend to a left from the left side face of the cylinder part, and include a bend in order to extend ahead of the engine and directly over the alternating current generator,
- wherein, thereafter the exhaust pipes are shaped to turn back rearwardly after a bend to the left and immediately below a front end of an air cleaner case,
- wherein the exhaust pipes are merged into a junction pipe located on a left side of a boundary between the crankcase and the cylinder part so as to extend rearwardly,
- wherein the junction pipe passes along a lateral side of the oil tank and under the battery and is connected to a muffler which is arranged in a rear portion of the vehicle body so that a tip end of the muffler is directed diagonally upwardly.

15. The engine arrangement structure of a saddle-ride type vehicle according to claim 4, wherein the exhaust pipes include two exhaust pipes corresponding to two cylinders of the engine, and are connected to a left side face of the cylinder part of the engine,
- wherein the exhaust pipes extend to a left from the left side face of the cylinder part, and include a bend in order to extend ahead of the engine and directly over the alternating current generator,
- wherein, thereafter the exhaust pipes are shaped to turn back rearwardly after a bend to the left and immediately below a front end of an air cleaner case,
- wherein the exhaust pipes are merged into a junction pipe located on a left side of a boundary between the crankcase and the cylinder part so as to extend rearwardly,
- wherein the junction pipe passes along a lateral side of an oil tank and under a battery disposed behind the engine, and then is connected to a muffler which is arranged in a rear portion of the body frame so that a tip end of the muffler is directed diagonally upwardly.

16. The engine arrangement structure of a saddle-ride type vehicle according to claim 13, wherein the exhaust pipes include two exhaust pipes corresponding to two cylinders of the engine, and are connected to a left side face of the cylinder part of the engine,
- wherein the exhaust pipes extend to a left from the left side face of the cylinder part, and include a bend in order to extend ahead of the engine and directly over the alternating current generator,
- wherein, thereafter the exhaust pipes are shaped to turn back rearwardly after a bend to the left and immediately below a front end of an air cleaner case,
- wherein the exhaust pipes are merged into a junction pipe located on a left side of a boundary between the crankcase and the cylinder part so as to extend rearwardly,
- wherein the junction pipe passes along a lateral side of an oil tank and under a battery disposed behind the engine, and then is connected to a muffler which is arranged in a rear portion of the body frame so that a tip end of the muffler is directed diagonally upwardly.

17. The engine arrangement structure of a saddle-ride type vehicle according to claim 1, wherein the alternating current generator is housed immediately inside the front cover so that the alternating current generator and the front cover directly facing each other in the front-rear direction of the vehicle body.

* * * * *